May 17, 1960   W. L. VEATCH   2,936,776
VALVE
Filed Feb. 15, 1956

WALTER L. VEATCH.
INVENTOR.

BY Eugene C. Knoblock
ATTORNEY

United States Patent Office 2,936,776
Patented May 17, 1960

---

2,936,776

VALVE

Walter L. Veatch, Elkhart, Ind.

Application February 15, 1956, Serial No. 565,689

1 Claim. (Cl. 137—375)

This invention relates to improvements in valves.

The primary object of this invention is to provide a valve having a valve seat and a valve plug, and a flexible liner for said valve configured to conform to the cavity thereof and to the open position of said valve plug, which is yieldable upon movement of the valve plug to accommodate closing of the valve, with the liner having a diaphragm function to accommodate movement of the valve plug to sealing position.

A further object is to provide a valve having a body providing a passage between an inlet and an outlet, said passage, including a valve seat and an opening to shiftably receive a valve plug, wherein said valve passage is lined continuously from the inlet to outlet thereof by a flexible and fluid-impervious lining yieldable to accommodate closing of the valve by movement of the valve plug.

A further object is to provide a valve which may have a body formed of low cost fluid-pervious material provided with a fluid-impervious flexible liner effective to resist erosion, corrosion and distintegration of the valve body, to avoid wire drawing and other damage to the valve seat and to eliminate stem packing problems.

A further object is to provide a valve having a body with a passage therethrough completely lined by a flexible fluid-impervious liner and having a valve plug operated externally of the liner and effective to flex the liner between open and sealed positions without destroying the continuity of the liner or stretching the liner.

Other objects will be apparent from the following specification.

Figure 4:
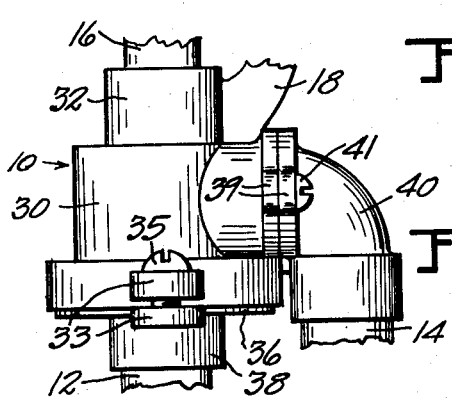
Fig. 4 is a fragmentary side view of a valve particularly well suited for use with this invention, and similar to the construction shown in Fig. 1.

Referring to the drawing, and particularly to Fig. 4, the numeral 10 designates a valve body to which are connected conduits 12 and 14. The valve element includes a slidable plunger 16 to which is pivotally connected an elongated valve lever (not shown) pivoted upon an arm 18 projecting from the valve body 10. Any suitable means associated with the end of the lever serves to operate the valve, and for this purpose the valve lever may mount a float (not shown) to constitute the device a float valve. As the lever swings about its pivot it serves to produce axial movement of the valve plunger 16 between seated and released position, i.e. between closed and open position of the valve. As shown, the portion of the plunger 16 slidable in body 10 is substantially cylindrical.

The valve body 10 is preferably formed of a substantially cup-shaped body part 30 having a projecting neck or sleeve portion 32 within which the valve plunger 16 is slidable to project into the cavity or bore 34 of the valve housing. Another valve housing part 36 cooperates with and fits partially within the mouth of part 30 to span the open end thereof. The valve part 36 carries a tubular or sleeve portion 38 at which the end of the tube or pipe 12 is connected, as by screw-threading or any other suitable means. Parts 30 and 36 may have projecting ears 33 for reception of securing means 35 to hold parts 30, 36 assembled. The other conduit 14 is screw-threaded or otherwise connected to a body portion 40 having a bore therethrough which communicates with the cavity of the body 10 when the parts 30 and 40 are operatively connected together as by interconnection by means of securing screws 41 or the like received in suitable openings or tapped holes in flanges or ears 39. The valve body parts 30, 36 and 40 may be formed of castings and need not be fluid-impervious.

My invention contemplates the provision of a flexible continuous fluid-impervious liner in the valve cavity 34. This liner may be formed of rubber, synthetic rubber, or any other flexible material adapted to hold its shape which may be found suitable. The liner 42 extends continuously within and substantially throughout the inner surface of the cavity 34. The liner includes an integral cup-shaped part having a tubular internal projection 44 adapted to receive the portion of the plunger 16 which normally projects into the valve cavity. The plunger preferably has a circumferential groove 46 spaced from its inner or free end. An integral rib 48 is preferably formed at the interior of the tubular liner portion 44 and seats in the groove 46. The cup-shaped liner portion includes an end wall 50, and the spacing between the rib 48 and the end wall 50 will preferably be such that the portion of the tubular liner part 44 between said rib and said end wall will be stretched incident to assembly of the parts, as shown in Fig. 1, thereby stressing the liner at 52 to provide an outward flare at its lowermost end as seen in Fig. 1 and to stiffen the marginal part of the end wall 50.

The liner 42 will preferably have formed integrally therewith a tubular end part whose axis extends at an angle to the axis of cup-shaped part 44, 50 and which terminates in an outturned gasket-defining flange 54 at one end thereof. The opposite end of the liner is also tubular and encircles part 44 and terminates in an outturned gasket-defining flange 56. Flanges 54 and 56 fit in suitable enlargements of the bore or cavity adjacent the ends thereof. The valve part 36 has a bore communicating with the bore of the tube 12. Part 36 carries a liner member 58 preferably having a tapered valve seat forming bore 60 registering with conduit 12 and the plunger 16 and preferably of slightly larger diameter than the end wall 50 of the plunger liner at one end and of smaller diameter than liner wall 50 at its other end. The liner member 58 preferably includes a sleeve portion 62 projecting into the bore of the tube 36 for abutment by the end of the tube 12 as shown. Member 58 is drawn into sealing engagement with gasket-defining flange 56 in the assembly of the valve body parts 30 and 36. Body part 40 is drawn into sealing engagement with gasket-defining flange 54 in the assembly of parts 30 and 40.

Figures 1, 2:
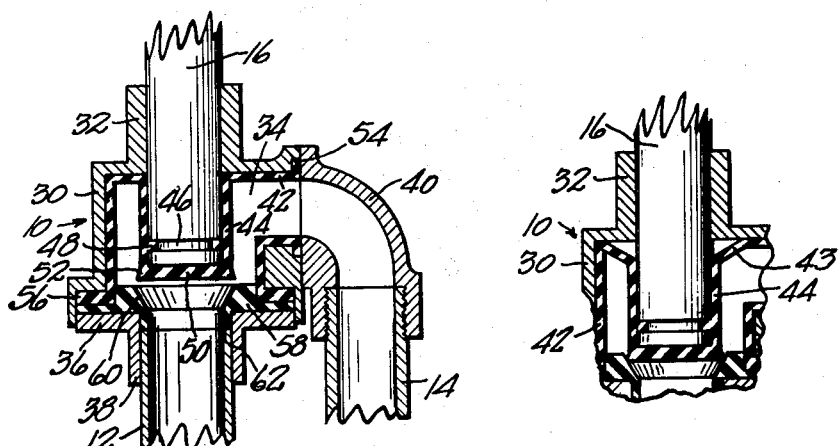
Fig. 1 is a sectional view illustrating one embodiment of the invention with the valve in open position.
Fig. 2 is a fragmentary sectional view illustrating the valve of Fig. 1 in its closed position.

It will be apparent from a consideration of Fig. 1 that axial reciprocation of the plunger 16 operates the valve between its open position shown in Fig. 1 and the closed position shown in Fig. 2. As downward or inward endwise or axial movement of the plunger 16 occurs from the Fig. 1 to the Fig. 2 position, the portion 43 of the liner 42 adjacent and surrounding the cup-shaped projection 44 flexes in the fashion of a diaphragm, as seen in Fig. 2, This flexure eliminates stretching or extension of the rubber portion 44 and permits the liner to yield readily without exerting great resistance to valve closure. Likewise, the flexure of the liner can occur without destroying the continuity of the liner and without destroying its fluid-impervious character.

By reason of the stretching of the liner at the part 52 incident to the assembly of the plunger 16 within the liner portion 44, 50, a substantially sharp planar circular edge is formed around the liner portion 50 which provides an effective seal when engaging in the concentric tapered bore 60 of the valve seat. In other words, because of the flexure of the part 52, which occurs substantially uniformly circumferentially thereof, the marginal edge of the liner wall 50 will be in a single plane and the entire circumferential extent of the edge of the wall 50 will seat at the concentric bore 60 simultaneously. Consequently, very little pressure is required to effect a complete and effective fluid-tight seal. The pressure which is exerted on plunger 60 need only be sufficient to effect a seal and does not require such distortion of the parts or deforming of the lining parts 42, 58 as to injure them from the standpoint of severing thereof or permanent deforming thereof.

It will be observed from Fig. 1 that, though the liner is formed in two parts, namely parts 42 and 58, the same may interfit and bear together so snugly as to eliminate all danger of leakage therebetween after the valve parts have been assembled. Thus the liner may be the equivalent of an integral liner extending continuously through the valve part 30 from the inlet to the outlet thereof. In other words, the end of tube 12 may bear against the liner part 62 at one end of the passages of the device, and the flanges 54 bear against the valve part 40 at the opposite end of the valve cavity 34. The continuous lining of the parts 30 and 36 of the valve housing makes possible the formation of those parts from material, such as cast iron, now not considered suitable for certain fluids, such as gas under pressure. In other words, the porosity of the metal of the casting which would normally prevent the use of the device with gases and certain fluids, does not detract from such use in a case where a liner 42, 58 is provided, as here shown.

Figure 3:
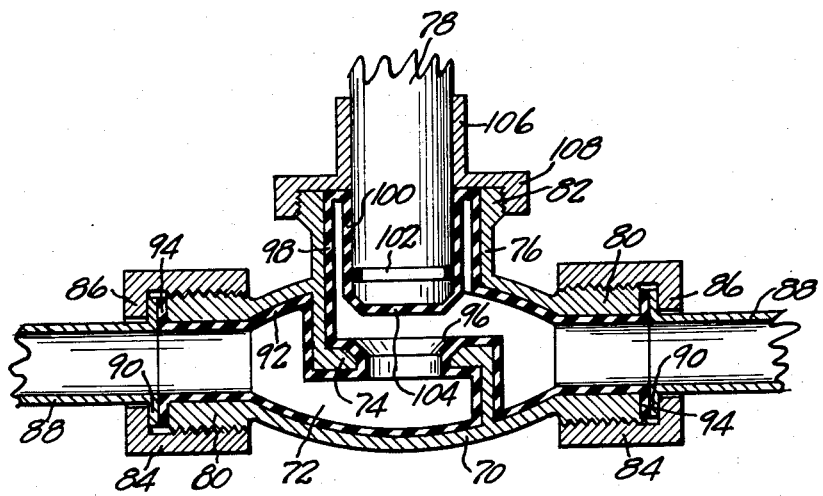
Fig. 3 is an axial sectional view of a modified globe type of valve embodying my invention.

Fig. 3 illustrates the application of the invention to a globe type of valve having a valve body 70, having a globe-like cavity 72 which is spanned by a partition 74 having an opening therethrough in axial alignment with a neck or sleeve portion 76 of the body within which is longitudinally shiftable a plunger 78 concentric or coaxial with the valve seat. The opposite ends of the valve body are preferably externally screw-threaded at 80, and the neck 76 is externally screw-threaded at 82. Cup-shaped retainers 84 having centrally apertured end walls 86 are screw-threaded on the portions 80. Conduit or tube portions 88 extend through the apertures in the walls 86 and have outturned flanges 90 adapted to bear against the inner faces of the end walls 86.

An integral flexible fluid-impervious liner preferably formed in one piece, though also formable in two or more pieces, conforms with the interior configuration of the hollow valve body 70 and fits in the valve body, as seen in Fig. 3. This liner 92 includes outturned flange portions 94 projecting from tubular liner end portions and adapted to bear against the conduit flanges 90 and thus provide a sealed joint between the respective conduits 88 and the valve body 70 in the fashion of a compression fitting. The liner extends through an opening in the partition 74 and defines a tapered valve seat 96 thereat. A tubular portion 98 of the liner extends through and lines the tubular portion 76 of the valve body and preferably has integrally formed therewith a tubular wall portion or sleeve 100 of a cup-shaped part having a snug fit around the valve plunger 78. The valve plunger 78 will preferably have a circumferential groove 102 spaced from its end which receives an integrally formed rib in the tubular part 100. An end wall 104 may be formed integrally with and span the end of the tubular liner part 100 to complete the cup-shaped part.

This construction possesses substantially the same advantages and is characterized by substantially the same mode of operation as the form illustrated in Figs. 1 and 2 described above. Thus as operation of the valve is to occur, the plunger 78 is shifted endwise from the Fig. 3 position toward the valve seat until the end of the cup-shaped plunger sheath portion 104 contacts the valve seat 96. In this construction this cup-shaped plunger sheath portion is characterized by a frusto conical configuration substantially conforming to the tapered configuration of the valve seat at 96. In all other particulars the parts 100, 104 and seat 96 effect a seal in substantially the same manner as shown in Fig. 1. The portion 98 of the liner is sufficiently flexible to accommodate flexing or re-shaping thereof incident to and for the accommodation of the downward movement of the plunger 78, so that no elongation or extension of the liner sleeve 100 is necessary. It will also be observed that an effective seal is provided around the plunger 78 without requiring the use of packings or stuffing glands. Thus the sleeve 106 carried by a nut or threaded retainer 108 screwed on valve neck 76 may have a loose fit around the plunger 78 without interfering with the sealed or fluid-tight character of the valve. In other words, because of the fact that the liner parts 98 and 100 are integral and prevent any escape of fluid from the interior of the valve body through the clearance between the plunger 78 and the sleeve 106, it is possible to eliminate packing material usually required between the body of a valve and the movable stem or plunger of the valve.

While the preferred embodiments of the invention have been illustrated, it will be understood that the invention can be applied in many other forms and embodiments, and that changes in the construction may be made within the scope of the appended claim without departing from the spirit of the invention.

I claim:

A valve comprising a housing having a passage therethrough, a valve seat intermediate the ends of said passage having a resilient lining and defining a tapered bore, and a bore through said housing aligned with said valve seat, a cylindrical plunger shiftable endwise in said last named bore and having a flat end face, and a flexible fluid-tight liner for said passage normally in continuous engagement with said housing, said liner including a cup-shaped part intermediate the ends of said passage receiving said plunger and adapted to fit in and bear against the tapered bore of said valve seat in one position, said cup-shaped part including a tubular portion and a transverse end wall having a flat outer surface said plunger having a circumferential groove spaced from its inner end and said cup-shaped liner part having a circumferential interor rib seating in said groove, said rib as molded being spaced from said liner end wall a distance slightly less than the spacing of said plunger groove from the end of said plunger whereby the tubular portion of the cup-shaped part of said liner adjacent said end wall as mounted on said plunger is stretched and thereby defines a sharp circumferential edge at said end wall, the axis of said cup-shaped portion extending at an angle to the portion of said liner adjacent thereto, and the portion of said liner adjacent said cup-shaped part fitting freely in said body to flex and thereby accommodate endwise movement of said cup-shaped liner part substantially without stretching thereof.

References Cited in the file of this patent

UNITED STATES PATENTS

| 1,070,803 | Harkom | Aug. 19, 1913 |
| 1,779,503 | Swindin | Oct. 28, 1930 |
| 1,947,257 | Fritz | Feb. 13, 1934 |
| 2,603,445 | Marchant | July 15, 1952 |

FOREIGN PATENTS

| 902,924 | Germany | Jan. 28, 1954 |